Oct. 27, 1964  E. M. McKOWN  3,154,651
LEAK DETECTING AND INDICATING MECHANISM FOR HYDRAULIC LINES
Filed March 5, 1963
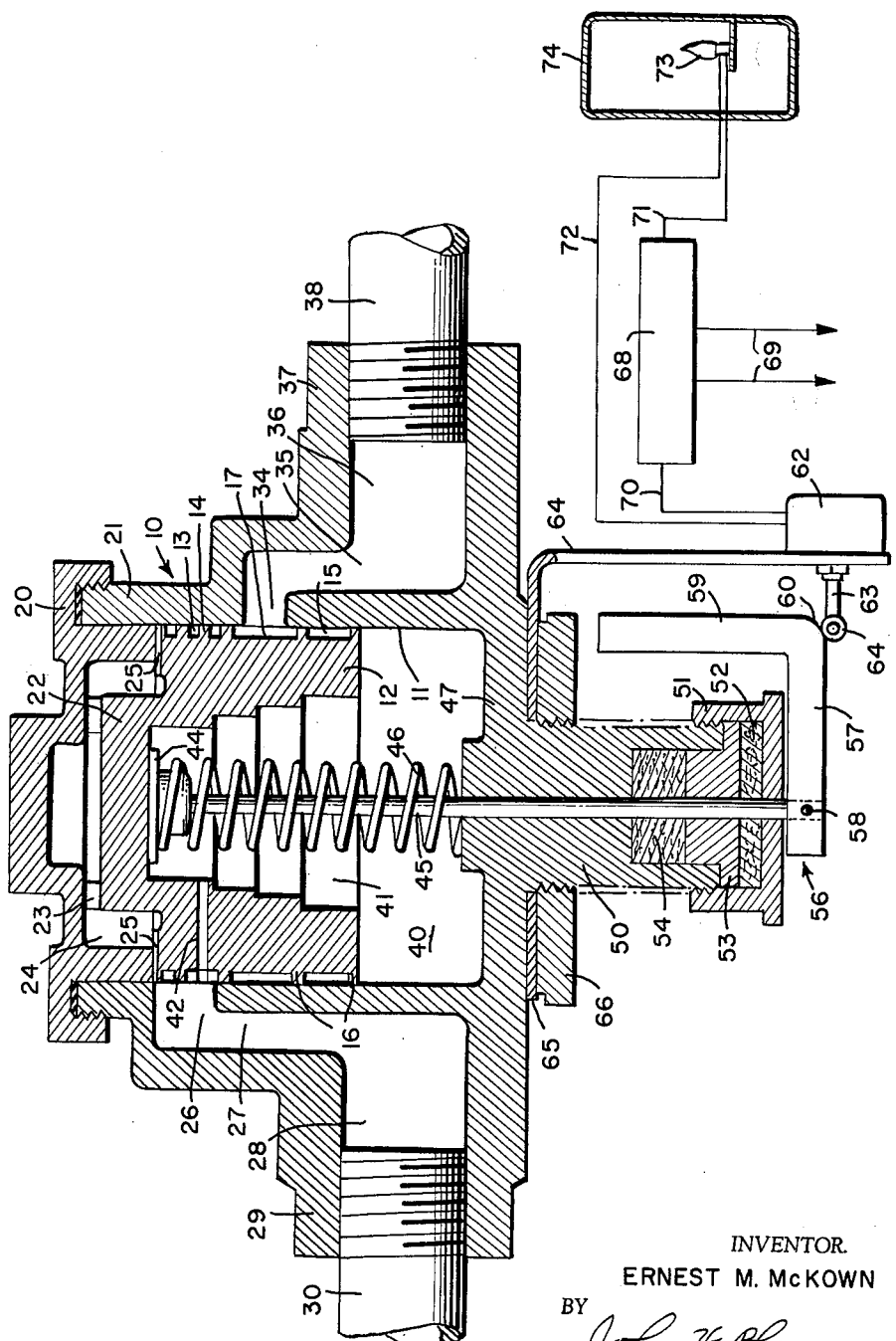
INVENTOR.
ERNEST M. McKOWN
BY John F. Phillips
ATTORNEY

3,154,651
LEAK DETECTING AND INDICATING MECHANISM FOR HYDRAULIC LINES
Ernest M. McKown, 406 Acredale Road,
Virginia Beach, Va.
Filed Mar. 5, 1963, Ser. No. 263,022
11 Claims. (Cl. 200—82)

This invention relates to a leak detecting and indicating mechanism for hydraulic lines, and particularly to water supply lines of houses and other buildings.

An important object of the invention is to provide a novel type of valve mechanism which functions to permit a free flow of water through a pipe line when a faucet is turned on, and which functions in a novel manner if a leak is present between the valve and the outlet faucets to facilitate the indicating of such leak.

A further object is to provide such a valve having a plunger normally occupying a given position from which it is movable for the free flow of water if a faucet is opened, and which plunger reciprocates or "hunts" if a leak is present in the line, which hunting of the plunger may be utilized for indicating the presence of the leak.

A further object is to provide such a valve mechanism in combination with an indicating device which so functions with the valve mechanism that the indicating element, such as an incandescent light, is inoperative while all faucets are turned off and no leak is present; which light is steadily operative during the period in which one or more faucets are turned on and which indicator or light functions intermittently if a leak is present.

A further object is to provide a leak indicating system of the character refered to wherein the "hunting" of the valve plunger is utilized for intermittently operating the indicator or signal to show that a leak is present.

Other objects or advantages of the invention will become apparent during the course of the following description.

In the drawing I have shown one embodiment of the invention. In this showing

The figure is an axial sectional view through the leak detecting valve mechanism and the indicating system associated therewith, parts of the latter being diagrammatically shown.

Referring to the drawing, the numeral 10 designates a cast valve body having a cylinder bore 11 formed therein and receiving an axially movable piston or plunger 12. This piston is circumferentially grooved in the upper portion thereof as at 13 to provide integral annular ribs 14. The lower portion of the piston is preferably grooved as at 15 to provide ribs 16 somewhat more widely spaced than the ribs 14. The lowermost rib 14 and the uppermost rib 16 are substantially spaced to provide an elongated annular groove 17. For a reason to be explained, all of the ribs 14 and 16 have clearance with the cylinder bore 11 to provide for seepage between the ribs and the cylinder.

A cap 20 is threaded on the upper cylindrical end 21 of the valve body, and an axial extension 22 on the plunger 12 has its upward movement relative to the cap 20 limited, for example, by lugs 23. The cap 20 and the upper end of the plunger 12 combine to form a chamber 24 which communicates as at 25 with the upper end 26 of an inlet passage 27, the lower end 28 of which extends through a boss 29 perpendicular to the axis of the valve mechanism. A supply pipe 30 is threaded into the inlet to supply water therethrough to the chamber 24.

In the normal position of the valve 12 as shown, the upper end 34 of an inlet 35 communicates with the interior of the cylinder opposite the groove 17. The passage 35 has an outlet portion 36, co-axial with the inlet passage portion 28 formed in a boss 37 and into which is threaded an outlet pipe 38 leading to the faucets and other water outlets of the building.

The plunger 12 forms with the valve body 10 a lower chamber 40. The plunger 12 is hollow as at 41 for communication with the chamber 40, and a leakage passage 42 may or may not be employed, for reasons to be described, communicating between the inlet passage end 26 and the interior of the plunger 12.

A spring seat 44 is arranged within the plunger 12 against the top thereof and carries a depending stem 45. This stem is surrounded by a compression spring 46, the upper end of which engages the spring seat 44 and the lower end of which engages the bottom wall 47 of the valve body to bias the plunger 12 toward its normal position shown.

The valve body is provided with a depending co-axial extension 50 provided at its lower end with a suitable packing gland through which the stem 45 projects. Such gland may include a lower cap 51, a body of packing material 52, a keeper 53, and an upper body 54 of packing material.

The lower end of the stem 45 operates a signal mechanism, preferably of the type shown. Such mechanism includes a switch operating member 56 having a lower horizontal arm 57 receiving the lower end of the stem 45 and pinned thereto as at 48. The member 56 further includes a vertical arm 59, the lower extremity of which curves as at 60 into the lower surface of the arm 57 and forms a switch operating cam.

A switch 62 having a reciprocating operating stem 63 is provided with a roller 64 operable by the cam surface 60. The switch 62 is carried by a bracket 64 having an upper attaching arm 65 fixed against the bottom of the valve body 10 by a nut 66.

A transformer 68 is connected to supply lines 69 from any suitable source of current, usually a 120-volt, 60-cycle source. The secondary circuit of the transformer is provided with lines 70 and 71, the former of which is connected to one terminal of the switch 62, the other terminal being connected to a wire 72. The wires 71 and 72 are connected to a signal light 73 preferably housed in a suitable box 74 which may have a glass wall (not shown) to render the light 73 visible.

Operation

The parts all normally occupy the positions shown in the drawing. The water in the lines 30 and 38 and in the various chambers and passages of the valve device will be under static pressure with all outlets shut off. Assuming that a faucet in the house or building is turned on, there will be an immediate pressure drop in the outlet 35 and in the line 38. Source pressure in the chamber 24 will immediately move the plunger 12 downwardly against the loading of the spring 46 until the top of the portion of the plunger 12 bearing the flanges 14 moves sufficiently below the top of the outlet portion 34 for a free flow of water from the inlet 30 to the outlet 35. Downward movement of the plunger 12 effects similar movement of the stem 45 and switch operating member 56 and the cam portion 60 will close the switch 62 to illuminate the light 73 or operate any other type of visible or audible signal. The arm 59 will maintain this switch 62 closed so long as a faucet is open, and a steady light will be provided by the signal 73.

Assuming that all faucets are closed and a leak occurs in the outlet line or lines in the building, gradual loss of pressure in the outlet 35, to which water leaks around the flanges 14, will permit pressure in the chamber 24 to gradually move the plunger 12 downwardly. Such downward movement will operate the light 73, and when the top of the main portion of the plunger uncovers the outlet port 34, pressure will drop above the plunger, whereupon the spring 46 reacts to move the plunger upwardly. Such upward movement, which must displace fluid from the chamber 24, is permitted primarily by the leakage of water past the flanges 14, if the bleed passage 42 is not used. After the flanges 14 move upwardly, the leakage continues to drop pressure in the outlet line 38, whereupon source pressure will again move the plunger 12 downwardly until pressure above the plunger is released into the outlet passage 35. So long as the leakage occurs, the plunger 12 will continue to reciprocate. Upon each downward movement, the cam 60 will operate the signal 73, and upon each upward movement the switch 62 will be opened. Thus the signal 73 will be intermittently operated and this gives an indication of the presence of a leak in the outlet line.

If the outer surfaces of the rings 14 and 16 and the cylinder 11 are made to exact tolerances, a bleed port, as indicated at 42, will not be needed, since water can be displaced downwardly around the plunger into the chamber 40 to provide for the "hunting" action of the plunger 12. If clearance between the plunger 12 and cylinder 11 is not sufficient as determined by test to provide the necessary seepage from the inlet to the outlet, one or more bleed passages 42 may be drilled as may be required, such passage in the drawing being exaggerated in diameter.

From the foregoing it will be apparent that the present construction may be directly installed between pipe sections in axial alignment with each other, such as the inlet and outlet pipes 30 and 38, and the device does not interfere in any way with the normal supply of water or other liquid from the pipe 30 to the pipe 38. When a faucet is opened, the plunger 12 immediately moves downwardly for the free flow of liquid through the valve mechanism. Under such conditions, the signal 73 will operate steadily. However, if a steady leak is present with all outlet valves or faucets shut off, the plunger 12 will reciprocate and will provide an intermittent operation of the signal 73, thus indicating that a leak is present. When all outlets are shut off and no leak is present, the signal 73 will remain out of operation, and this fact indicates that there is no leakage from the outlet lines.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A leak detecting valve mechanism for hydraulic lines, comprising a housing having a bore therein, a reciprocating structure including a plunger communicating with said bore slidable in said bore, a chamber above said plunger, an inlet port communicating with the upper end of said bore, an outlet port communicating with said bore below the level of said inlet port, said reciprocating structure including an element slidable in sealed relation to said housing and projecting therefrom to be visible, and means biasing said plunger toward said chamber, there being leakage means from said inlet port to said outlet port whereby, when a leak occurs in an outlet connected to said outlet port, source pressure will move said plunger downwardly until the top thereof clears the top of said outlet port, whereupon said biasing means moves said plunger toward said chamber, such movement of said plunger displacing fluid through said leakage means to said outlet port.

2. A leak detecting valve mechanism for hydraulic lines, comprising a housing having a bore therein, a plunger slidable in said bore, a chamber above said plunger communicating with said bore, an inlet port communicating with the upper end of said bore, said housing having an outlet port communicating with said bore below the level of said inlet port, a stem engaging said plunger and having an end projecting from said housing to be visible and in sealed relation to said housing, and a spring biasing said plunger toward said chamber, there being leakage means around said plunger whereby, when a leak occurs in an outlet connected to said outlet port, source pressure will move said plunger downwardly until the top thereof clears the top of said outlet port, whereupon said biasing means moves said plunger toward said chamber, such movement of said plunger displacing fluid through said leakage means to said outlet port.

3. A leak detecting mechanism for hydraulic lines comprising a housing having a bore therein, a reciprocating structure including a plunger slidable in said bore and having a plurality of circumferential grooves providing annular ribs therebetween relatively loosely sliding in said bore to provide leakage means past said plunger, a chamber above said plunger communicating with said bore, an inlet port communicating with the upper end of said bore, an outlet port communicating with said bore below the level of said inlet port, said reciprocating structure including an element slidable in sealed relation to said housing and having an end projecting therefrom to be visible, and means biasing said plunger toward said chamber, said inlet port being adapted to be connected to a source of liquid pressure whereby when a leak occurs in an outlet connected to said outlet port, source pressure will move said plunger until the top thereof clears said outlet port, whereupon said biasing means moves said plunger toward said chamber, such movement of said plunger displacing fluid through said leakage means to said outlet port.

4. A leak detecting valve mechanism for hydraulic lines comprising a housing having a bore therein, a plunger slidable in said bore, said housing having a chamber at one end of said plunger communicating with said bore, an inlet port communicating with said chamber and with said bore adjacent said chamber, an outlet port communicating with said bore at a point longitudinally spaced from said inlet port, a spring seat engaging said plunger at the side thereof opposite said chamber, a spring engaging said spring seat to bias said plunger toward said chamber, and a stem connected at one end to said spring seat and having its other end projecting in sealed relation through said housing to a point externally thereof to be visible, said plunger being provided with a plurality of spaced annular grooves forming annular ribs therebetween relatively loosely slidable in said bore to provide leakage means past said ribs, whereby, when a leak occurs in an outlet connected to said outlet port, pressure in said chamber will move said plunger until the adjacent end thereof opens said chamber to said outlet port, whereupon said spring will move said plunger toward said chamber, such movement of said plunger displacing fluid through said leakage means to said outlet port.

5. A leak detecting valve mechanism for hydraulic lines, comprising a housing having a bore therein, a reciprocating structure including a plunger slidable in said bore, a chamber above said plunger communicating with said bore, an inlet port communicating with the upper end of said bore, an outlet port communicating with said bore below the level of said inlet port, said reciprocating structure including an element slidable in sealed relation to said housing and projecting therefrom, means biasing said plunger toward said chamber, there being leakage means from said inlet port to said outlet port whereby, when a leak occurs in an outlet connected to said outlet port, source pressure will move said plunger downwardly until the top thereof clears the top of said outlet port, whereupon said biasing means moves said plunger toward said chamber, such movement of said plunger displacing fluid through said leakage means to said outlet port, and signal means connected to the projecting portion of said element to indicate movement thereof.

6. A leak detecting valve mechanism for hydraulic lines, comprising a housing having a bore therein, a plunger slidable in said bore, a chamber above said plunger communicating with said bore, an inlet port communicating with the upper end of said bore, said housing having an outlet port communicating with said bore below the level of said inlet port, a stem engaging said plunger and having an end projecting from said housing, and in sealed relation to said housing, a spring biasing said plunger toward said chamber, there being leakage means around said plunger whereby, when a leak occurs in an outlet connected to said outlet port, source pressure will move said plunger downwardly until the top thereof clears the top of said outlet port, whereupon said biasing means moves said plunger toward said chamber, such movement of said plunger displacing fluid through said leakage means to said outlet port, and a signal device connected to the projecting end of said stem to indicate movement thereof.

7. A leak detecting mechanism for hydraulic lines comprising a housing having a bore therein, a reciprocating structure including a plunger slidable in said bore and having a plurality of circumferential grooves providing annular ribs therebetween relatively loosely sliding in said bore to provide leakage means past said plunger, a chamber above said plunger communicating with said bore, an inlet port communicating with the upper end of said bore, an outlet port communicating with said bore below the level of said inlet port, said reciprocating structure including an element slidable in sealed relation to said housing and having an end projecting therefrom, means biasing said plunger toward said chamber, said inlet port being adapted to be connected to a source of liquid pressure whereby when a leak occurs in an outlet connected to said outlet port, source pressure will move said plunger until the top thereof clears said outlet port, whereupon said biasing means moves said plunger toward said chamber, such movement of said plunger displacing fluid through said leakage means to said outlet port, and an indicating device having engagement with said end of said element to be operated thereby to indicate movement thereof.

8. A leak detecting valve mechanism for hydraulic lines comprising a housing having a bore therein, a plunger slidable in said bore, said housing having a chamber at one end of said plunger, an inlet port communicating with said chamber and with said bore adjacent said chamber, an outlet port communicating with said bore at a point longitudinally spaced from said inlet port, a spring seat engaging said plunger at the side thereof opposite said chamber, a spring engaging said spring seat to bias said plunger toward said chamber, a stem connected at one end to said spring seat and having its other end projecting in sealed relation through said housing to a point externally thereof, said plunger being provided with a plurality of spaced annular grooves forming annular ribs therebetween relatively loosely slidable in said bore to provide leakage means past said ribs, whereby, when a leak occurs in an outlet connected to said outlet port, pressure in said chamber will move said plunger until the adjacent end thereof opens said chamber to said outlet port, whereupon said spring will move said plunger toward said chamber, such movement of said plunger displacing fluid through said leakage means to said outlet port, and signal means adapted to be operated by said other end of said stem to indicate movement thereof.

9. A leak detecting valve mechanism for hydraulic lines, comprising a housing having a bore therein, a plunger slidable in said bore, a chamber above said plunger communicating with said bore, an inlet port communicating with the upper end of said bore, said housing having an outlet port communicating with said bore below the level of said inlet port, a stem engaging said plunger and having an end projecting from said housing, and in sealed relation to said housing, a spring biasing said plunger toward said chamber, there being leakage means around said plunger whereby, when a leak occurs in an outlet connected to said outlet port, source pressure will move said plunger downwardly until the top thereof clears the top of said outlet port, whereupon said biasing means moves said plunger toward said chamber, such movement of said plunger displacing fluid through said leakage means to said outlet port, an electrical indicating system including a normally closed switch, and a switch operating element connected to said end of said stem and out of engagement with said switch when said plunger is in an uppermost normal position and engageable with said switch for closing said switch in all other positions of said plunger.

10. A leak detecting valve mechanism for hydraulic lines comprising a housing having a bore therein, a plunger slidable in said bore, said housing having a chamber at one end of said plunger communicating with said bore, an inlet port communicating with said chamber and with said bore adjacent said chamber, an outlet port communicating with said bore at a point longitudinally spaced from said inlet port, a spring seat engaging said plunger at the side thereof opposite said chamber, a spring engaging said spring seat to bias said plunger toward said chamber, a stem connected at one end to said spring seat and having its other end projecting in sealed relation through said housing to a point externally thereof, said plunger being provided with a plurality of spaced annular grooves forming annular ribs therebetween relatively loosely slidable in said bore to provide leakage means past said ribs, whereby, when a leak occurs in an outlet connected to said outlet port, pressure in said chamber will move said plunger until the adjacent end thereof opens said chamber to said outlet port, whereupon said spring will move said plunger toward said chamber, such movement of said plunger displacing fluid through said leakage means to said outlet port, an electrical signal system including a switch, and a switch operating member connected to said other end of said stem, said operating member having a cam surface releasing said switch when said plunger is in a normal position adjacent said chamber, said cam surface extending into a switch-holding surface parallel to the axis of said stem whereby, in any position other than the normal position of said plunger, said switch will be closed.

11. A leak detecting valve mechanism for hydraulic lines comprising a housing having a bore therein, a plunger slidable in said bore, a chamber above said plunger communicating with said bore, an inlet port communicating with the upper end of said bore, an outlet port communicating with said bore below the level of said inlet port, means biasing said plunger toward said chamber, there being leakage means from said inlet port to said outlet port whereby, when a leak occurs in an outlet connected to said outlet port, source pressure will move said plunger downwardly until the top thereof clears the top of said outlet port, whereupon said biasing means moves said plunger toward said chamber, such movement of said plunger displacing fluid through said leakage means to said outlet port, and means for indicating the position of said plunger.

References Cited in the file of this patent
FOREIGN PATENTS
11,902    Great Britain _____ Sept. 18, 1886